(12) United States Patent
Iwamoto

(10) Patent No.: US 9,288,785 B2
(45) Date of Patent: Mar. 15, 2016

(54) SYSTEM FOR REMINDING USER TO REMOVE SMARTPHONE FROM VEHICLE WHEN EXITING

(71) Applicants: DENSO International America, Inc., Southfield, MI (US); DENSO CORPORATION, Kariya-shi, Aichi-ken (JP)

(72) Inventor: Reiji Iwamoto, West Bloomfield, MI (US)

(73) Assignees: Denso International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/616,179

(22) Filed: Feb. 6, 2015

(65) Prior Publication Data

US 2015/0257125 A1    Sep. 10, 2015

Related U.S. Application Data

(60) Provisional application No. 61/947,788, filed on Mar. 4, 2014.

(51) Int. Cl.
  *H04W 68/00* (2009.01)
  *H04B 5/00* (2006.01)
  *H04B 1/3822* (2015.01)
  *H04M 1/22* (2006.01)

(52) U.S. Cl.
  CPC ............. *H04W 68/00* (2013.01); *H04B 1/3822* (2013.01); *H04B 5/0037* (2013.01); *H04M 1/22* (2013.01)

(58) Field of Classification Search
  CPC ... H04W 68/00; H04B 1/3822; H04B 5/0037; H04M 1/22
  See application file for complete search history.

(56) References Cited

U.S. PATENT DOCUMENTS

| 8,493,226 B2* | 7/2013 | Tedesco | G08B 13/1427 340/539.1 |
|---|---|---|---|
| 2009/0096417 A1* | 4/2009 | Idzik | H02J 7/0044 320/115 |
| 2013/0249478 A1* | 9/2013 | Hirano | H02J 7/0047 320/108 |

FOREIGN PATENT DOCUMENTS

CA        2640903 A1 *  4/2009 ............ G06F 1/1626

* cited by examiner

*Primary Examiner* — Mehmood B Khan
(74) *Attorney, Agent, or Firm* — Harness, Dickey & Pierce, P.L.C.

(57) ABSTRACT

A system for detecting a smart device left in vehicle. The system includes a capacitor, a first switch, and a second switch. The capacitor is configured to store energy generated by a voltage source configured to power vehicle accessories. The first switch is movable between an open position and a closed position. The first switch is configured to be in the open position when the voltage source is on, and in the closed position when the voltage source is off. A second switch is movable between an open position and a closed position. The second switch is configured to be in the open position when the smart device is not on a charging pad, and in the closed position when the smart device is on the charging pad. The system generates a notification that the smart device has been left on the charging pad when both the first and the second switches are in the closed position. The notification is powered by the capacitor.

17 Claims, 2 Drawing Sheets

SYSTEM FOR REMINDING USER TO REMOVE SMARTPHONE FROM VEHICLE WHEN EXITING

CROSS-REFERENCE TO RELATED APPLICATION

Figure 1:
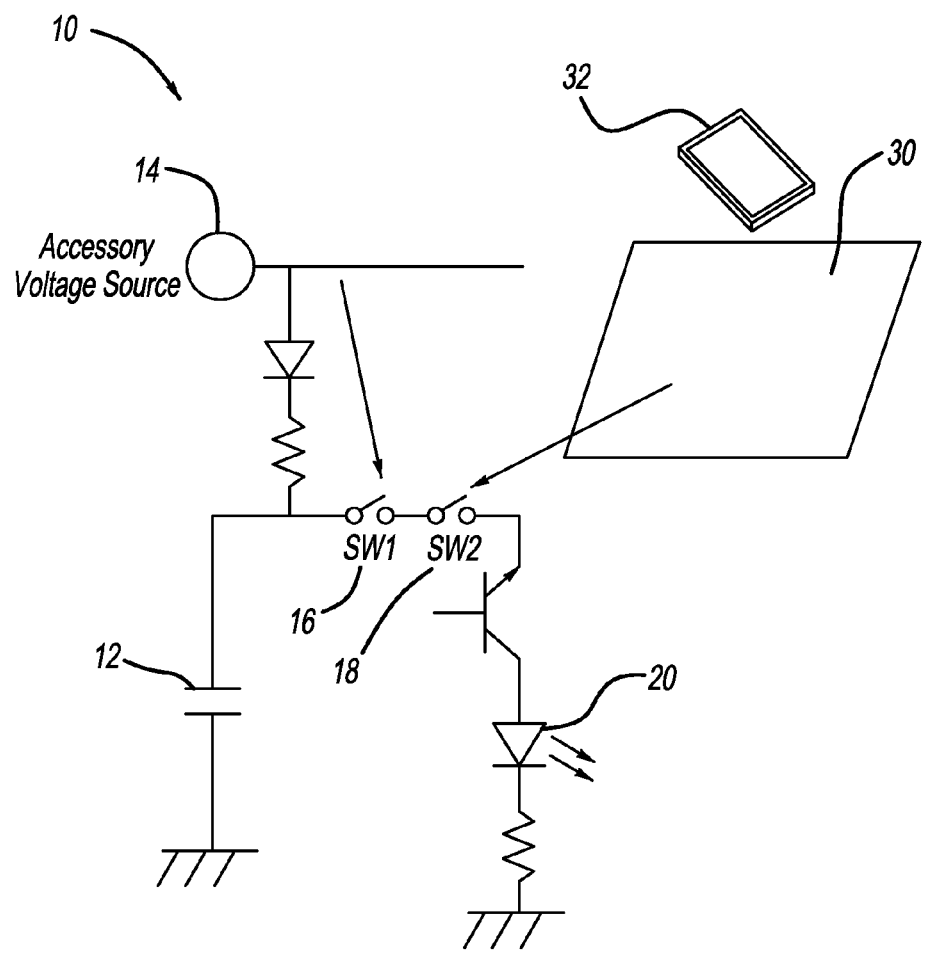

This application claims the benefit of U.S. Provisional Application No. 61/947,788 filed on Mar. 4, 2014, the entire disclosure of which is incorporated herein by reference.

FIELD

The present disclosure relates to methods, devices, and systems for using a wireless charger as a vehicle alarm to remind a user to remove their smartphone.

BACKGROUND

This section provides background information related to the present disclosure, and is not necessarily prior art.

Misplacement of, or forgetting, smart devices, such as smartphones, is a common problem. For example, users sometimes leave their smartphone in their vehicle when exiting their vehicle in a rush. A system and method for reminding a user to take their smartphone with them as they exit their vehicle would thus be desirable. Such a system and/or method would be particularly desirable if it does not consume battery power after the vehicle has been turned off. The present teachings address these concerns by providing systems and methods for generating a notification reminder to alert a user that they have left, or are about to leave, their smartphone in a vehicle. The systems and methods according to the present teachings use a capacitor to power the notification, and do not use battery power after the vehicle has been turned off.

SUMMARY

This section provides a general summary of the disclosure, and is not a comprehensive disclosure of its full scope or all of its features.

The present teachings provide for a system for detecting a smart device left in vehicle. The system includes a capacitor, a first switch, and a second switch. The capacitor is configured to store energy generated by a voltage source configured to power vehicle accessories. The first switch is movable between an open position and a closed position. The first switch is configured to be in the open position when the voltage source is on, and in the closed position when the voltage source is off. A second switch is movable between an open position and a closed position. The second switch is configured to be in the open position when the smart device is not on a charging pad, and in the closed position when the smart device is on the charging pad. The system generates a notification that the smart device has been left on the charging pad when both the first and the second switches are in the closed position. The notification is powered by the capacitor.

The present teachings further provide for a method for reminding a user that a smart device has been left in a vehicle. The method includes the following: charging a capacitor of the vehicle using a voltage source of the vehicle configured to power vehicle accessories; moving a first switch from an open position when the voltage source is on to a closed position when the voltage source is off; moving a second switch from an open position when the smart device is not seated on a charging pad to a closed position when the smart device is seated on the charging pad; and generating a notification when both the first and the second switches are in the closed position such that the notification is powered by the capacitor, the notification signaling that the smart device has been left on the charging pad.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
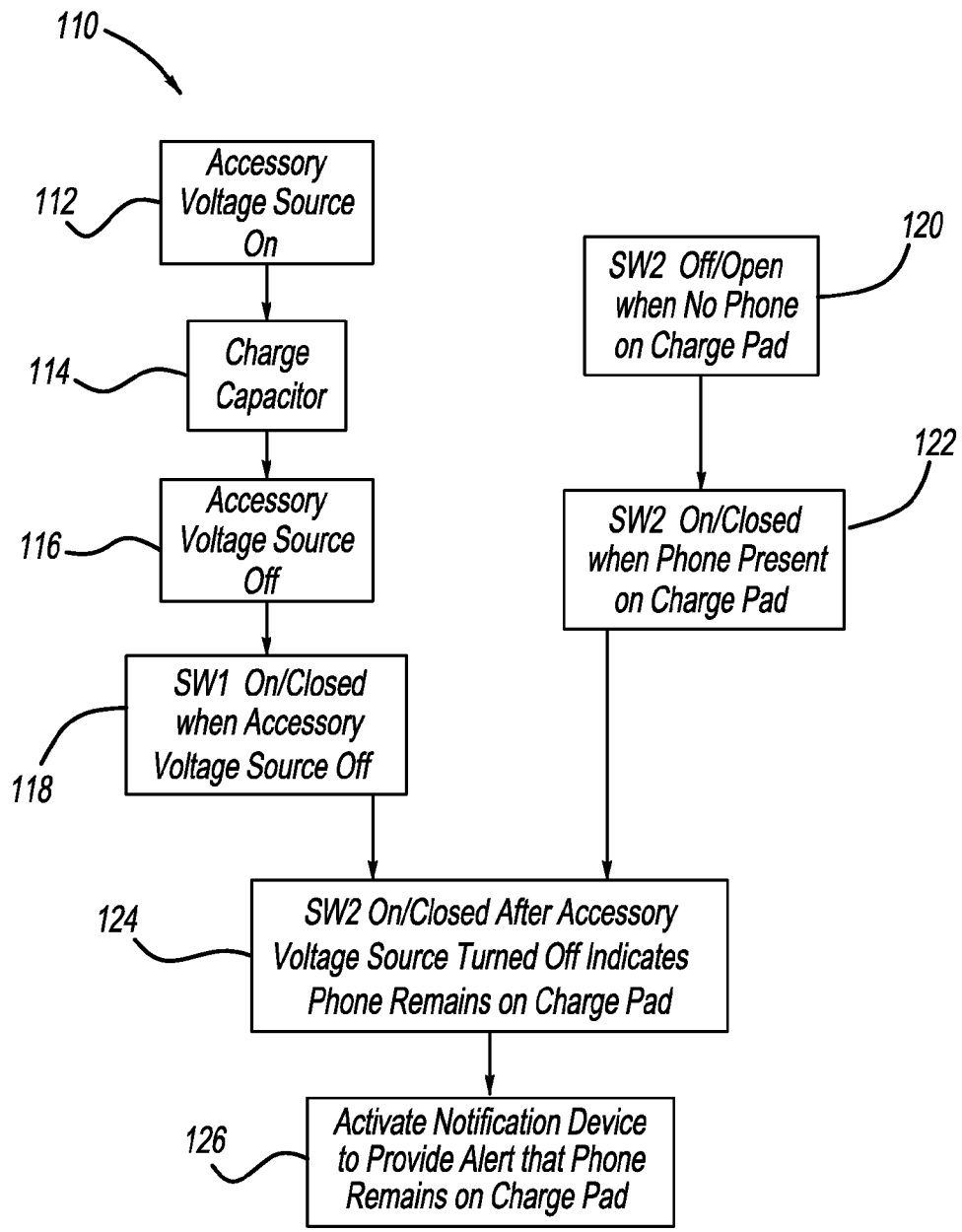

FIG. 1 is a diagram of a system according to the present teachings for reminding a user that they have left their smartphone on a wireless charging pad when the user exits the vehicle; and FIG. 2 illustrates a method according to the present teachings for reminding a user that they have left their smartphone on a charging pad when the user exits the vehicle.

Corresponding reference numerals indicate corresponding parts throughout the several views of the drawings.

DETAILED DESCRIPTION

Example embodiments will now be described more fully with reference to the accompanying drawings.

A system according to the present teachings for alerting a user that they are about to leave their smartphone in a vehicle as the user is exiting the vehicle is generally illustrated in FIG. 1 at reference numeral 10. The system 10 generally includes a capacitor 12 configured to store energy electrostatically in an electric field. The capacitor 12 receives energy from, and is thus charged by, an ACC (accessory) voltage source 14, which can be any suitable voltage source, such as a battery, configured to provide energy to vehicle accessories, such as a vehicle entertainment system. The system 10 further includes a first switch (SW1) 16, a second switch (SW2) 18, and any suitable notification device 20, such as a diode. The system 10 further includes a wireless charging pad 30 for charging any suitable portable electronic device 32, such as any suitable smart device, such as a smartphone. Although the charging pad 30 is illustrated and described as a wireless charging pad, any suitable charging device can be used, such as a wired charging device. Charging current to the charging pad 30 can be provided by any suitable source. Further, although the portable electronic device 32 is described herein as a smartphone, any suitable portable electronic device can be used.

The first switch 16 is movable between an off or open position, and an on or closed position. When the ACC voltage source 14 is on, the first switch 16 is in the off or open position, and the capacitor 12 is charged by the ACC voltage source 14. When the ACC voltage source 14 is turned off, such as when a user turns their vehicle off upon exiting the vehicle, the first switch 16 moves to the on or closed position.

The second switch 18 is also movable between an off or open position, and an on or closed position. When there is no smartphone 32 being charged on the charging pad 30, the second switch 18 is in the off or open position. When the smartphone 32 is being charged on the charging pad 30, the second switch 18 is in the on or closed position.

An exemplary method for operating the system 10 will now be described with respect to method 110 illustrated in FIG. 2. With initial reference to block 112, when the ACC voltage source is on and the first and/or second switches 16 and 18 are in the off/open position, the ACC voltage source 14 will charge the capacitor 12 at block 114. When the ACC voltage source 14 is turned off at block 116, such as when a user turns their vehicle off and turns off all accessory power, typically signaling that the user intends to leave the vehicle, the first switch (SW1) 16 moves to the on/closed position at block 118.

With reference to block 120, the second switch 18 will be in the off/open position when no smartphone 32 is seated on the charging pad 30. When a smartphone 32 is placed on the charging pad 30, such as for charging, the second switch (SW2) 18 moves to the on/closed position at block 122.

With reference to block 124, if after the ACC voltage source 14 has been turned off, thus causing the first switch 16 to move to the on/closed position, the second switch 18 is in the on/closed position, this means that the smartphone 32 has been left on the charging pad 30. Because turning off the ACC voltage source 14 typically is done only when a user is exiting a vehicle, the situation at block 124 typically signifies that the user is about to leave his or her smartphone 32 in the vehicle.

With both the first and second switches 16 and 18 in the on or closed position, charge from the capacitor 12 is directed to the notification device 20 at block 126. The notification device 20 can be any suitable notification device or system suitable for generating an alert for the user, such as a visual alert or an audible alert. Any suitable visual alert can be provided, such as a blinking light, such as a light emitting diode (LED), for example. Any suitable audible alert can be generated, such as a buzzer. The notification device 20 will thus remind the user to take their smartphone with them as they exit the vehicle.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used in this application is for the purpose of describing particular example embodiments only and is not intended to be limiting. The singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used interpreted accordingly.

The description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for detecting a smart device left in a vehicle comprising:
    a capacitor configured to store energy generated by a voltage source configured to power vehicle accessories;
    a first switch movable between an open position and a closed position, the first switch is configured to be in the open position when the voltage source is on, the first switch is configured to be in the closed position when the voltage source is off; and
    a second switch movable between an open position and a closed position, the second switch configured to be in the open position when the smart device is not on a charging pad, the second switch configured to be in the closed position when the smart device is on the charging pad;
    wherein the system generates a notification that the smart device has been left on the charging pad when both the first and the second switches are in the closed position, the notification powered by the capacitor.

2. The system of claim 1, wherein the smart device is a smartphone.

3. The system of claim 1, wherein the notification is a visual notification.

4. The system of claim 3, wherein the visual notification is generated by a diode.

5. The system of claim 1, wherein the notification is an audible notification.

6. The system of claim 5, wherein the audible notification includes a buzzer.

7. The system of claim 1, wherein the notification is both audible and visual.

8. The system of claim 1, wherein the notification is solely powered by the capacitor.

9. The system of claim 1, wherein the notification is not directly powered by the voltage source when the vehicle is off.

10. A method for reminding a user that a smart device has been left in a vehicle:
    charging a capacitor of the vehicle using a voltage source of the vehicle configured to power vehicle accessories;
    moving a first switch from an open position when the voltage source is on to a closed position when the voltage source is off;
    moving a second switch from an open position when the smart device is not seated on a charging pad to a closed position when the smart device is seated on the charging pad; and
    generating a notification when both the first and the second switches are in the closed position such that the notification is powered by the capacitor, the notification signaling that the smart device has been left on the charging pad.

11. The method of claim 10, wherein the smart device is a smartphone.

12. The method of claim 10, wherein generating a notification includes generating a visual notification.

13. The method of claim 10, wherein generating a notification includes generating an audible notification.

14. The method of claim 10, wherein generating a notification includes generating both an audible notification and a visual notification.

15. The method of claim 10, wherein generating a notification includes generating a visual notification with a diode.

16. The method of claim 10, wherein generating a notification includes generating an audible notification with a buzzer.

17. The method of claim 10, wherein the notification is powered directly by the capacitor.

\* \* \* \* \*